INVENTOR:
CHIYOJI KAWAGUCHI
by Otto John Munz
attorney

Oct. 3, 1967 CHIYOJI KAWAGUCHI 3,345,577

SYMMETRICAL MAGNETIC AMPLIFIER

Filed Dec. 31, 1963

2 Sheets-Sheet 2

INVENTOR:
CHIYOJI KAWAGUCHI by attorney 3,345,577

SYMMETRICAL MAGNETIC AMPLIFIER

Chiyoji Kawaguchi, Tokai-mura, Naka-gun, Ibaraki, Japan, assignor to Nihon Genshiryoku Kenkyu Sho, Tokyo, Japan Filed Dec. 31, 1963, Ser. No. 334,868
Claims priority, application Japan, Jan. 8, 1963, 38/86
1 Claim. (Cl. 330—8)

ABSTRACT OF THE DISCLOSURE

A magnetic control amplifier providing equal output currents of a single polarity in response to an input current of either negative or positive polarity with the same absolute value and employing negative feedback means for effectuating this symmetry.

This invention relates to a symmetrical magnetic amplifier, and, more specially, relates to a magnetic amplifier which has symmetrical characteristics and which is so constituted that uni-directional output will be obtainable from bi-directional controlling input by means of the negative feedback of the magnetic amplifier output to controlling windings through feedback windings.

Generally, controlling systems sometimes necessitate uni-directional output for the input of either positive or negative polarities. This applies to the case, for example, where alarming is necessary when electric current surpasses +I ampere or −I ampere. Under such circumstances meter relays are traditionally used, but they are not necessarily of sufficient reliability because of their mechanism. Further, circuits for the use in the same cases necessitate plurality of their components, resulting in the complexity of the circuits. The above request is uossible of realization by the use of saturable reactors, provided that the signal level of the system is high and that large amount of amplification is not necessary.

Figure 1:
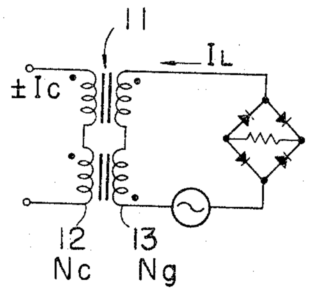
Fig. 1 PRIOR ART
Figure 2:
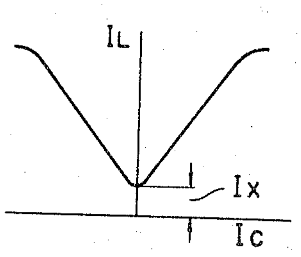
Fig. 2 PRIOR ART
Figure 3A:
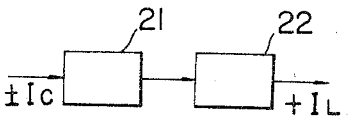
Fig. 3a PRIOR ART
Figure 3B:
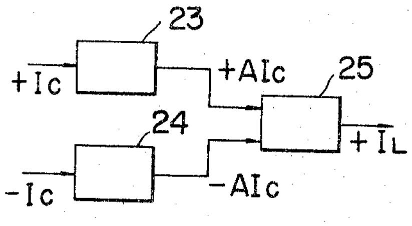
Fig. 3b PRIOR ART
Figure 3C:
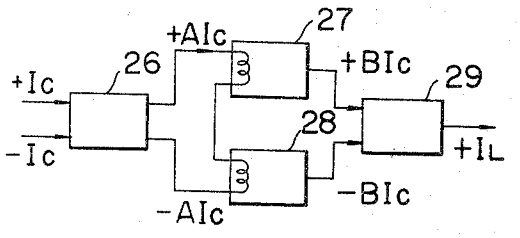
Fig. 3c PRIOR ART
Figure 4:
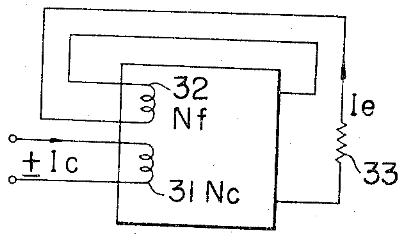
Figure 5:
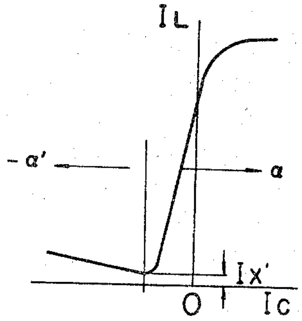
Figure 6:
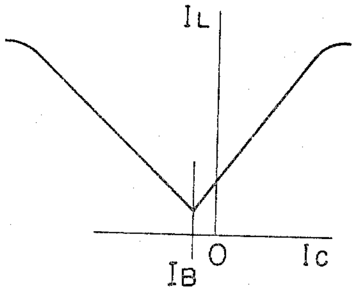
Figure 7:
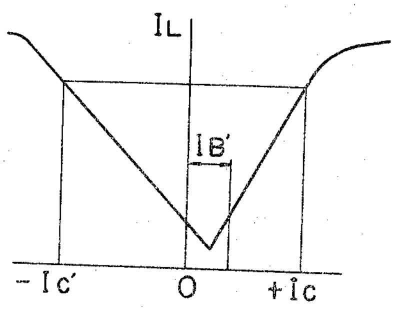
Figure 8:
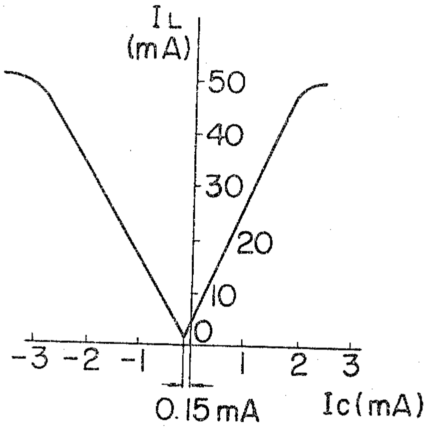

The object and advantage of this invention will become readily apparent from the following detailed description, in which:

FIG. 1 shows a traditional network of a magnetic amplifier using saturable reactors, FIG. 2 shows the characteristic curve of the magnetic amplifier depicted in FIG. 1, FIG. 3 shows an example of the traditional networks of the symmetrical magnetic amplifier, FIG. 4 shows the network of the symmetrical magnetic amplifier based on the invention, FIG. 5 is the characteristic curve of the magnetic amplifier of FIG. 4 without feedback, Both FIGS. 6 and 7 are the characteristic curves of the magnetic amplifier of FIG. 4 with feedback, and FIG. 8 is the diagram showing the experimental results of the magnetic amplifier depicted in FIG. 4.

In FIG. 1, the saturable reactor 11 is constituted of the controlling winding 12 having winding turns $N_c$ and the winding 13 having winding turns $N_g$, and the output current is generated by the application of the controlling current $I_c$ to the controlling winding 12.

The gain G and the output current $I_x$ without input signal are given by the following formulae, $$G=N_c/N_g$$

$$I_x=D.H_c/0.4N_g$$

where

D ------------------ Diameter of magnet core.
$H_c$ ------------------ Coercive force of magnet core.

Therefore, it becomes necessary to make the turns $N_g$ a large number and the turns $N_c$ an excessively large number in order to reduce the output current $I_x$ and to increase the gain. But this is extremely difficult in concern with the window area of the windings and in many cases this is not accomplished by a single stage of the saturable reactor. In FIG. 2, the characteristic of the saturable reactor of FIG. 1 is drawn making the controlling current $I_c$ the axis of abscissa and the output current $I_L$ the axis of ordinate. Under these circumstances, there are some methods comprising one where two stages of the saturable reactors 21 and 22 are used as drawn in FIG. 3*a*, one where the saturable reactor 25 is used after the single stage amplification by either the amplifier 23 or the amplifier 24 as shown in FIG. 3*b*, and one where the saturable reactors 27 and 28 are connected with the push-pull magnetic amplifier 26 and the logic circuit 29 is used at the same time as depicted in FIG. 3*c*. Each of these methods is constituted of the complicated circuits and needs some measures for eliminating the influences of $I_x$.

In the method related to the invention, negative feedback is utilized for the achievement of this purpose by a stage of the magnetic amplifier. FIG. 4 shows its connection. In FIG. 5, the characteristic in the absence of the feedback is shown. Suppose that the current gain per one turn of the controlling windings 31 of the turns $N_c$ is $\alpha$ in the right-hand region of the minimum output current and that it is $-\alpha'$ in the left-hand region, then the current gain G with the feedback is $$G=\alpha N_c/(1+\alpha N_f)$$

in the right-hand region, and provided that $\alpha N_f \gg 1$, then it becomes approximately $$G=N_c/\alpha N_f \quad (1)$$

and on the other hand in the left-hand region, it is $$G'=\alpha' N_c/(1-\alpha' N_f) \quad (2)$$

where it is assumed that the feedback winding 32 has the turns $N_f$. It will be apparent from the equations 1 and 2 that the gain decreases in the right-hand region and that it increases in the left-hand region by means of the negative feedback. Accordingly, the characteristic of FIG. 5 changes into that of FIG. 6. The similar characteristic as that of FIG. 1 will be obtained by furnishing the biasing current $I_B$. Moreover, it will be possible to increase the gain appreciably by the self-feedback action. If the gain $-\alpha'$, turns $N_c$ and the turns $N_f$ are so chosen that the Equations 1 and 2 are equal, the symmetrical characteristic will be obtained. For either the negative or the positive inputs of the same values, the same amount of the output may surely be obtained, but, as these values are concerned with magnetic cores, restifiers and source potentials, etc. in use, complete symmetry is in some cases difficult to be obtained. In such cases, it will be possible to obtain the constant output current $I_L$ for $|I_c|=|I_c'|$ by changing the biasing current $I_B'$ as shown in FIG 7.

According to the method of the invention, the linearity and the stability of the system will be extraordinarily eminent because of the feedback, and, moreover, it is quite possible to obtain high current gain with the smaller number of the turns than that of the ordinary saturable reactors. Therefore, this method is practicable for an appreciably low level signal. The non-contact meter relay with the uni-directional output for the bi-directional input can be realized by an appropriate design with heed to the utilization of the negative feedback in the $-\alpha'$ region, where the limited attention has been payed only to negative feedback in the $+\alpha$ region, hitherto. FIG. 8 shows an example of its experimental results.

While a preferred embodiment of the present invention is disclosed, it is recognized that the scope of the present invention is not limited thereto and it is therefore intended that the scope of the present invention be defined by the scope of the appended claim.

What is claimed is:

A magnetic amplifier for providing a unidirectional output control signal the magnitude of which is symmetrical with respect to input signals of either polarity comprising: a saturable core, a control winding having input terminals and having $N_c$ turns wound on said core, a feedback winding having $N_f$ turns wound on said core in a direction opposite to the direction of the control winding, output means coupled to said core for providing an output current of a single polarity having, in the absence of a negative feedback signal applied to said feedback winding, a control current-versus-output current characteristic curve with a minimum value for a given control current, for control currents to the right of said given control current a current gain $\alpha N_c$, and for control currents to the left of said given control a current gain $-\alpha' N_c$, where $\alpha$ is greater than $\alpha'$, and means coupling said output current to said feedback winding, the number of control winding turns $N_c$, the number of feedback winding turns $N_f$, and the current gain $-\alpha'$ being so chosen that $$N_c/\alpha N_f = \alpha' N_c/(1-\alpha' N_f)$$

with $$\alpha N_f \gg 1$$

whereby equal output currents of a single polarity will be produced in response to an input current of either negative or positive polarity with the same absolute value.

References Cited

UNITED STATES PATENTS

| | | | |
|---|---|---|---|
| 2,970,253 | 1/1961 | Bolton | 330—8 X |
| 3,172,054 | 3/1965 | Quilici et al. | 330—8 |
| 3,271,690 | 9/1966 | Cockrell | 330—8 |

ROY LAKE, *Primary Examiner.*

NATHAN KAUFMAN, *Examiner.*